(12) United States Patent
Zhang et al.

(10) Patent No.: US 10,547,921 B2
(45) Date of Patent: Jan. 28, 2020

(54) METHOD AND APPARATUS FOR REALIZING OPTICAL NETWORK UNIT ACTIVATION

(71) Applicant: ZTE CORPORATION, Guangdong (CN)

(72) Inventors: Weiliang Zhang, Guangdong (CN); Dan Geng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/067,561

(22) PCT Filed: Aug. 18, 2016

(86) PCT No.: PCT/CN2016/095863
§ 371 (c)(1),
(2) Date: Jun. 29, 2018

(87) PCT Pub. No.: WO2017/113814
PCT Pub. Date: Jul. 6, 2017

(65) Prior Publication Data
US 2019/0014398 A1    Jan. 10, 2019

(30) Foreign Application Priority Data
Dec. 29, 2015  (CN) .......................... 2015 1 1015526

(51) Int. Cl.
*H04J 14/00* (2006.01)
*H04Q 11/00* (2006.01)

(52) U.S. Cl.
CPC ............................... *H04Q 11/0067* (2013.01)

(58) Field of Classification Search
CPC .. H04B 10/27; H04B 10/2507; H04B 10/272; H04J 14/0282; H04J 14/0246;
(Continued)

(56) References Cited

U.S. PATENT DOCUMENTS 9,820,022 B2 * 11/2017 Wilson ............... H04Q 11/0067
2011/0280578 A1 * 11/2011 Wu ....................... H04J 3/0682
398/67
(Continued)

FOREIGN PATENT DOCUMENTS

| CN | 102687427 A | 9/2012 |
| CN | 104779994 A | 7/2015 |
| WO | 2014131352 A1 | 9/2014 |

OTHER PUBLICATIONS

International Search Report dated Nov. 7, 2016 for International Application No. PCT/CN2016/095863, 5 pages.
(Continued)

*Primary Examiner* — Hanh Phan
(74) *Attorney, Agent, or Firm* — Knobbe Martens Olson & Bear LLP (57) ABSTRACT

A method for activating an Optical Network Unit (ONU) is provided, where the ONU communicates with an Optical Line Terminal (OLT) through a plurality of paths. The method includes: finding the ONU by the OLT on a path of the plurality of paths; and/or selecting one path from the plurality of paths and performs a ranging on the ONU on the selected path, by the OLT. Through this solution, the OLT finds the ONU and performs ranging on each ONU on only one of the plurality of paths, that is, does not activate each ONU on all paths, thereby quickly completing an activation process of a multi-path PON in a multi-path PON structure and improving work efficiency.

19 Claims, 2 Drawing Sheets

(58) Field of Classification Search
CPC ............... H04J 14/0256; H04J 14/026; H04Q 11/0067; H04Q 11/0066
USPC ........ 398/66, 67, 68, 69, 70, 71, 72, 79, 98, 398/100, 45, 48, 49, 58, 25, 33; 370/352, 370/392, 389, 468, 465
See application file for complete search history.

(56) References Cited

U.S. PATENT DOCUMENTS

2013/0272699 A1  10/2013  Liang
2016/0006608 A1  1/2016  Khotimsky et al.

OTHER PUBLICATIONS

Written Opinion of the International Searching Authority dated Nov. 7, 2016 for International Application No. PCT/CN2016/095863, 3 pages.

\* cited by examiner (Prior Art)

METHOD AND APPARATUS FOR REALIZING OPTICAL NETWORK UNIT ACTIVATION

CROSS REFERENCE TO RELATED APPLICATIONS

The present application is a national phase of PCT Application No. PCT/CN 2016/095863 filed on Aug. 18,2016, which claims a priority to Chinese Patent Application No. 201511015526.8 filed on Dec. 29, 2015, the disclosure of which are incorporated in their entries by reference herein.

TECHNICAL FIELD

The present application relates to, but is not limited to, Passive Optical Network (PON) technologies and, in particular, to a method and apparatus for activating an Optical Network Unit.

BACKGROUND

Figure 1:
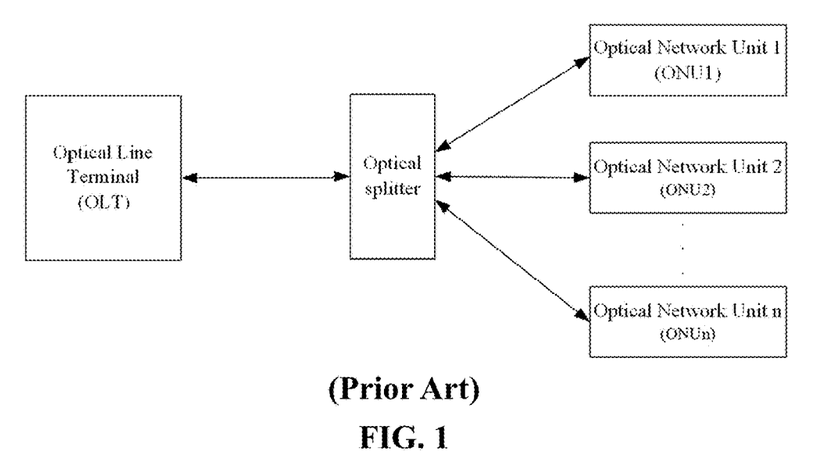
FIG. 1 is a schematic diagram of a structure of a related PON system.

With the rapid development of broadband services, users' demands for access network bandwidth have increased dramatically. Passive Optical Networks (PONs) are currently an important technology for user access. As shown in FIG. 1, in the structure of a related PON system, an Optical Line Terminal (OLT) is connected to an optical splitter through a backbone optical fiber, the optical splitter is connected to multiple Optical Network Units (ONUs) through branch optical fibers, and the OLT communicates with each ONU through one wavelength pair. To implement communication between the OLT and each ONU, the following activation process between the OLT and each ONU needs to be completed first: The OLT opens a quiet window on a downlink wavelength and requests identity information from each ONU (like ONU1, ONU2 . . . ONUn in FIG. 1) through the optical splitter and each ONU reports its own identity information on an uplink wavelength through the optical splitter; after obtaining the identity information of each ONU, the OLT opens the quiet window again on the downlink wavelength and sends a ranging request to each ONU, and likewise, each ONU responds to the ranging request on the uplink wavelength, and the OLT completes ranging. In this way, after the above activation process is completed, the OLT sends data to relevant ONUs according to downlink service conditions and allocates bandwidth to each ONU according to the uplink service status of each ONU or the bandwidth request of each ONU, and each ONU sends uplink data within its own allocated bandwidth.

SUMMARY

The following is a summary of a subject matter of the present disclosure. This summary is not intended to limit the scope of the claims.

Embodiments of the present disclosure provide a method and apparatus for activating an Optical Network Unit (ONU) that are capable of quickly completing an activation process of a multi-path PON.

The present disclosure provides a method for activating an ONU, where the ONU communicates with an Optical Line Terminal (OLT) through a plurality of paths. The method includes:

find the ONU by the OLT on a path of the plurality of paths; and/or selecting one path from the plurality of paths and performing a ranging on the ONU on the selected path, by the OLT.

Optionally, the finding the ONU by the OLT on the path of the plurality of paths includes:

opening a quiet window by the OLT on one or more paths of the plurality of paths and finding one or more ONUs by the OLT on the one or more paths on which the quiet window has been opened, and receiving, by the OLT, ONU identity information returned by each of the one or more ONUs on one path determined from the one or more paths on which the quiet window has been opened.

Optionally, the selecting the one path from the plurality of paths and performing the ranging on the ONU on the selected path, by the OLT includes:

selecting the one path from the plurality of paths and performing, on the selected path, the ranging on one or more ONUs that have been found, and receiving, by the OLT, a ranging response returned by each of the one or more ONUs on one or more paths selected from the plurality of paths to make the OLT obtain a ranging result.

Optionally, the each of the one or more ONUs selects one path from the one or more paths on which the quiet window has been opened according to information about the one or more paths on which the quiet window has been opened and local information, and reports the identity information of the each ONU on the selected one path.

Optionally, local information of the each of the one or more ONUs includes: whether the ONU was activated on one path of the one or more paths on which the quiet window has been opened last time or before, and/or determining by the ONU whether a collision is relatively small when the ONU returns the identity information on the path, and/or whether working power consumption of the ONU is relatively low on the path.

Optionally, the one or more paths on which the OLT has opened the quiet window are ONU-supported paths.

Optionally, if the OLT is not sure of the ONU-supported paths, the OLT opens the quiet window on all paths; and the method further includes: receiving, by the OLT, information reported by the each of the one or more ONUs about a path supported by the each of the one or more ONUs.

Optionally, the selecting the one path from the plurality of paths by the OLT includes:

selecting the one path from the plurality of paths according to obtained ONU identity information, information about the plurality of paths and local information, and performing a ranging on the one or more ONUs on the selected one path from the plurality of paths.

Optionally, the local information of the OLT includes: whether or not a path from the plurality of paths is a path that underwent ranging when the one or more ONUs were activated last time or before; and/or whether or not the path from the plurality of paths is a path on which the OLT estimates that a return time is relatively short; and/or whether or not the path from the plurality of paths is a path on which traffic is relatively light; and/or whether or not the path from the plurality of paths is a path on which local working power consumption of the OLT is relatively small.

Optionally, the each of the one or more ONUs selects the one or more paths from the plurality of paths and returns the ranging response on the selected one or more paths to make the OLT obtain the ranging result as follows:

in a case that the plurality of paths are a plurality of wavelength pairs in one optical fiber, the each of the one or more ONUs returns, to the OLT, the ranging response on a path on which a ranging request has been sent; and the OLT calculates a ranging result on the path and calculates ranging results on other paths according to wavelength values; or in a case that the plurality of paths are a plurality of optical fibers, the each of the one or more ONUs simultaneously returns, to the OLT, the ranging response on the path on which the ranging request has been sent and returns, to the OLT, the ranging response on other one or more paths; and the OLT calculates ranging results on the path and on the other one or more paths on which the OLT receives the ranging response; or in a case that the plurality of paths are a plurality of wavelength pairs in a plurality of optical fibers, the each of the one or more ONUs simultaneously returns, to the OLT, the ranging response on the path on which the ranging request has been sent and returns, to the OLT, the ranging response on other one or more paths; and the OLT calculates ranging results on the path and on the other one or more paths on which the OLT receives the ranging response, and calculates ranging results on other wavelength pairs in a same optical fiber according to wavelength values and the ranging results on the path and on the other one or more paths on which the OLT receives the ranging response.

Optionally, each ONU on the plurality of paths is provided with one and only one identifier, and each of the plurality of paths is provided with a path identifier corresponding to one channel.

Embodiments of the present disclosure further provide an apparatus for activating an Optical Network Unit (ONU). The apparatus includes at least a finding module and/or a ranging module.

The finding module is configured to find the ONU on a path of a plurality of paths.

The ranging module is configured to select one path from the plurality of paths and perform a ranging on the ONU on the selected path.

Optionally, the finding module is configured to open a quiet window on one or more paths of the plurality of paths and find one or more ONUs on the one or more paths on which the quiet window has been opened; and receive identity information reported by the ONU.

Optionally, the ranging module is configured to determine one path from the one or more paths on which the quiet window has been opened and perform, on the determined path, the ranging on one or more ONUs that have been found; and receive a ranging response returned by each of the one or more ONUs.

Optionally, the finding module is further configured to open the quiet window on all paths and receive information reported by the each of the one or more ONUs about a path supported by the each of the one or more ONUs.

Optionally, the ranging module is configured to select the one path from the plurality of paths according to obtained ONU identity information, information about the plurality of paths and local information and perform a ranging on the one or more ONUs on the selected one path from the plurality of paths, and select the one path on which the quiet window has been opened from the plurality of paths and send a ranging request to the each of the one or more ONUs on the one path; and receive the ranging response returned by the ONU, and calculate a ranging result on the one path and calculate ranging results on other paths according to wavelength values; or calculate ranging results on the one path and on other one or more paths on which the ranging response has been received; or calculate ranging results on the one path and on other one or more paths on which the ranging response has been received, and calculate ranging results on other wavelength pairs in a same optical fiber according to wavelength values and the ranging results on the path and on the other one or more paths on which the ranging response has been receive.

Embodiments of the present disclosure further provide an apparatus for activating an Optical Network Unit (ONU). The apparatus includes at least a finding processing module and/or a ranging processing module.

The finding processing module is configured to return its own identity information on one path of a plurality of paths.

The ranging processing module is configured to select one or more paths from the plurality of paths and return a ranging response on the selected one or more paths.

Optionally, the finding processing module is configured to receive a finding request from an Optical Line Terminal (OLT), and select the one path from the plurality of paths and return its own identity information to the OLT on the selected one path.

Optionally, the ranging processing module is configured to receive a ranging request from an Optical Line Terminal (OLT), and select the one or more paths from the plurality of paths and return the ranging response to the OLT on the selected one or more paths.

Optionally, the ranging processing module is configured to: in a case that the plurality of paths are a plurality of wavelength pairs in one optical fiber, return the ranging response to the OLT on a path on which the ranging request has been received; or in a case that the plurality of paths are a plurality of optical fibers or a plurality of wavelength pairs in a plurality of optical fibers, simultaneously return the ranging response to the OLT on the path on which the ranging request has been received and on other one or more paths.

Embodiments of the present disclosure further provide a computer-readable storage medium configured to store computer-executable instructions for implementing the above-mentioned method for activating an ONU when the computer-executable instructions are executed.

Compared with the related art, the solution provided by the present application, where an ONU communicates with an OLT through a plurality of paths, includes: finding the ONU by the OLT on a path of the plurality of paths; and/or selecting one path from the plurality of paths and performing a ranging on the ONU on the selected path. Through the solution provided by embodiments of the present disclosure, the OLT finds each ONU and performs ranging on each ONU on only one of the plurality of paths, that is, does not activate each ONU on all paths, thereby quickly completing an activation process of a multi-path PON in a multi-path PON structure and improving work efficiency.

Other features and advantages of the present application will be elaborated hereinafter in the description and, moreover, partially become apparent from the description, or will be understood through implementation of the present application. The object and other advantages of the present application may be achieved and obtained through structures set forth in the description, claims and drawings.

BRIEF DESCRIPTION OF DRAWINGS

The accompanying drawings described herein are used to provide a further understanding of the present application and form a part of the present application. The exemplary embodiments and descriptions thereof in the present application are used to explain the present application and not to limit the present application in an improper way. In the accompanying drawings.

DETAILED DESCRIPTION

Embodiments of the present disclosure will be detailed below with reference to the accompanying drawings. If not in collision, the embodiments described herein and the features thereof may be combined with each other.

Figure 2A:
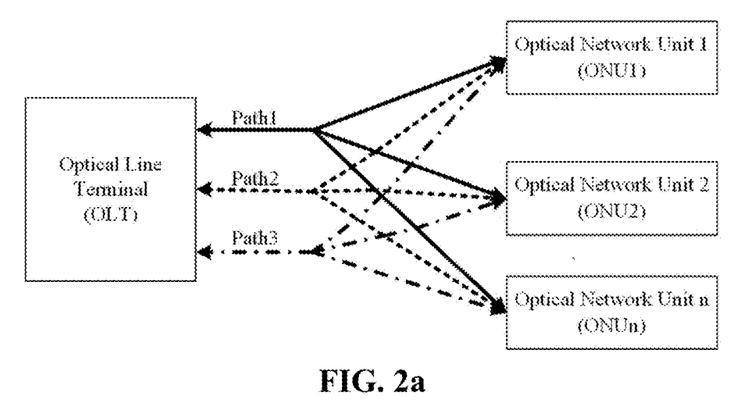
FIG. 2a is a schematic diagram 1 illustrating implementation of a multi-path PON according to an embodiment of the present disclosure.
Figure 2B:
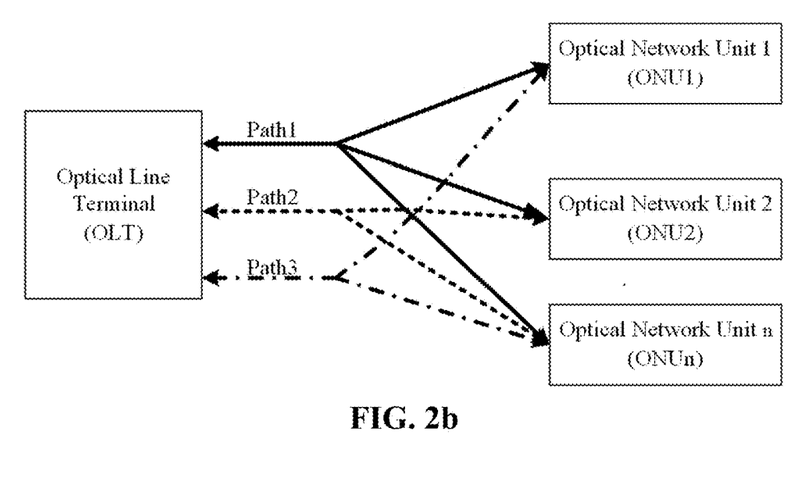
FIG. 2b is a schematic diagram 2 illustrating implementation of a multi-path PON according to an embodiment of the present disclosure.

To improve PON network capacity, the present application proposes a multi-path PON. For example, as shown in FIG. 2a, the path 1 is indicated by a thick black solid line, the path 2 is indicated by a thick black dotted line, and the path 3 is indicated by a thick black dot-dash line. Furthermore, as shown in FIG. 2b, a path 1 is indicated by a thick black solid line, a path 2 is indicated by a thick black dotted line, and a path 3 is indicated by a thick black dot-dash line. Different from FIG. 2a, the number of paths supported by an ONU is a part of the number of paths supported by an OLT, and each ONU may support a different number of paths. The multi-path PON can improve PON network capacity quickly. For simplicity, an optical splitter is not shown in FIGS. 2a and 2b. If an activation process of the multi-path PON is completed using a mode of a related single-path technology, then the ONU on each path is activated separately on the each path according to a related process. That is, the activation process is performed on all paths. This apparently decreases work efficiency. In order for the multi-path PON to be used on a large scale, embodiments of the present disclosure provide a solution to complete a related process (like the activation process) quickly in the multi-path PON so as to improve work efficiency.

In an embodiment of the present disclosure, the ONU communicates with the OLT through a plurality of paths, that is, forming a multi-path PON. A method for activating an ONU according to the embodiment includes: finding the ONU by the OLT on a path of the plurality of paths; and/or selecting one path from the plurality of paths and performing a ranging on the ONU on the selected path, by the OLT.

The finding the ONU by the OLT on the path of the plurality of paths includes: opening a quiet window by the OLT on one or more paths of the plurality of paths and finding one or more ONUs by the OLT on the one or more paths on which the quiet window has been opened, and receiving, by the OLT, ONU identity information returned by each of the one or more ONUs on one path determined from the one or more paths on which the quiet window has been opened.

The selecting the one path from the plurality of paths and performing the ranging on the ONU on the selected path, by the OLT includes: selecting the one path from the plurality of paths and performing, on the selected path, the ranging on one or more ONUs that have been found, and receiving, by the OLT, a ranging response returned by each of the one or more ONUs on one or more paths selected from the plurality of paths to make the OLT obtain a ranging result.

Figure 3:
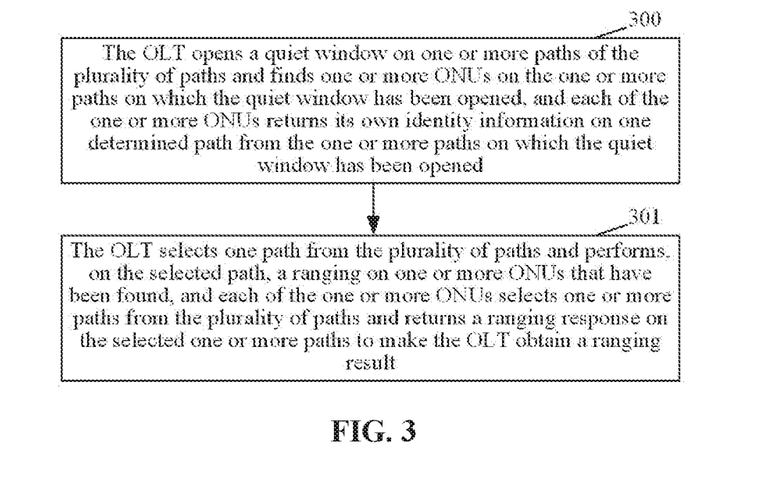
FIG. 3 is a flowchart of a method for activating an ONU in a multi-path PON according to an embodiment of the present disclosure.

FIG. 3 is a flowchart of a method for activating an ONU in a multi-path PON according to an embodiment of the present disclosure. As shown in FIG. 3, the method provided by the embodiment includes the steps described below.

In step 300, the OLT opens a quiet window on one or more paths of a plurality of paths and finds one or more ONUs on the one or more paths on which the quiet window has been opened, and each of the one or more ONUs determines one path from the one or more paths on which the quiet window has been opened and returns identity information of the each ONU on the determined path.

In an embodiment of the present disclosure, the each of the one or more ONUs on the plurality of paths is provided with one and only one identifier, such as an ONU identifier (ONU-ID) and a Media Access Control (MAC) address. Each of the plurality of paths is provided with a path identifier corresponding to one channel. That is, each of the one or more ONUs has multiple path identifiers and one path identifier corresponds to one channel.

The one or more paths on which the OLT has opened the quiet window are ONU-supported paths.

If the OLT is not sure of the ONU-supported paths, the OLT opens the quiet window on all paths. This ensures that the ONU can return identity information to the OLT through its own supported path. In this case, the ONU also reports information about a path supported by the ONU to the OLT.

In this step, each of the one or more ONUs determines one path from the one or more paths on which the quiet window has been opened and returns the identity information of the each ONU on the determined path as follows: the each of the one or more ONUs selects one path from the one or more paths on which the quiet window has been opened according to information about the one or more paths on which the quiet window has been opened and local information, and reports the identity information of the each ONU on the selected one path. Local information of the each of the one or more ONUs includes, but is not limited to: whether the ONU was activated on one path of the one or more paths on which the quiet window has been opened last time or before, and/or the OUN determines whether a collision is relatively small when the ONU returns the identity information on the path, and/or whether working power consumption of the ONU is relatively low on the path.

Here, different ONUs may determine same or different paths, but the path determined by each ONU is a path on which the OLT has opened a quiet window; and each ONU was activated on the path last time or before, and/or each ONU determines that a collision is relatively small when the ONU returns the identity information on the path, and/or working power consumption of each ONU is relatively low on the path. Whether the collision is relatively small and whether the working power consumption is relatively low may be determined by preset rules, such as thresholds. The determining method is known to those skilled in the art and is not intended to limit the scope of the present application and thus will not be described herein.

In step 301, the OLT selects one path from the plurality of paths and performs a ranging, on the selected one path, on the one or more ONUs that have been found, and each of the one or more ONUs selects one or more paths from the plurality of paths and returns a ranging response on the selected one or more paths to make the OLT obtain a ranging result.

After the one or more ONUs have been found in step 300, the OLT obtains not just the ONU identity information, but the ONU-supported paths.

In this step, selecting the one path from the plurality of paths by the OLT includes: selecting the one path from the plurality of paths according to obtained ONU identity information, information about the plurality of paths and local information, and performing a ranging on the one or more ONUs on the selected one path from the plurality of paths. That is, the OLT sends a ranging request to each ONU through the quiet window that has been opened on the selected path. Local information of the OLT includes, but is not limited to: whether or not a path from the plurality of paths is a path that underwent ranging when the one or more ONUs were activated last time or before; and/or whether or not the path from the plurality of paths is a path on which the OLT estimates that a return time is relatively short; and/or whether or not the path from the plurality of paths is a path on which traffic is relatively light; and/or whether or not the path from the plurality of paths is a path on which local working power consumption of the OLT is relatively small.

Here, the path selected by the OLT and used for ranging is a path on which the OLT has opened a quiet window; and the path is a path that underwent a ranging when the one or more ONUs were activated last time or before, and/or the path is a path on which the OLT estimates that a return time is relatively short, and/or the path is a path on which traffic is relatively light, and/or the path is a path on which local working power consumption of the OLT is relatively small.

In this step, the each of the one or more ONUs selects the one or more paths from the plurality of paths and returns the ranging response on the selected one or more paths to make the OLT obtain the ranging result as follows:

in a case that the plurality of paths are a plurality of wavelength pairs in one optical fiber, the each of the one or more ONUs returns, to the OLT, the ranging response on a path on which the ranging request has been sent; and the OLT calculates a ranging result on the path and calculates ranging results on other paths according to wavelength values; or in a case that the plurality of paths are a plurality of optical fibers, the each of the one or more ONUs simultaneously returns, to the OLT, the ranging response on the path on which the ranging request has been sent and returns, to the OLT, the ranging response on other one or more paths; and the OLT calculates ranging results on the path and on the another one or more paths on which the OLT receives the ranging response; or in a case that the plurality of paths are a plurality of wavelength pairs in a plurality of optical fibers, the each of the one or more ONUs simultaneously returns, to the OLT, the ranging response on the path on which the ranging request has been sent and returns, to the OLT, the ranging response on other one or more paths; and the OLT calculates ranging results on the path and on other one or more paths on which the OLT receives the ranging response, and calculates ranging results on other wavelength pairs in a same optical fiber according to wavelength values and the ranging results on the path and on the other one or more paths on which the OLT receives the ranging response.

In this way, the OLT can apply the ranging results on these paths locally or send the ranging results to the ONUs.

It is to be noted that finding and ranging processes can be performed on different paths in embodiments of the present disclosure.

Through the solution provided by embodiments of the present disclosure, the OLT finds one or more ONU and/or performs a ranging on the found one or more ONUs on only one path selected from the plurality of paths, that is, it is not necessary to activate each ONU on all paths, thereby quickly completing an activation process of a multi-path PON in a multi-path PON structure and improving work efficiency.

It is to be noted that the method for finding an ONU according to embodiments of the present disclosure includes at least a combination of any technical features described in step 300. The method for performing a ranging on an ONU according to embodiments of the present disclosure includes at least a combination of any technical features described in step 301.

Embodiments of the present disclosure further provide an apparatus for activating an ONU corresponding to the method provided by foregoing embodiments of the present disclosure. The apparatus includes at least a finding module and/or a ranging module.

The finding module is configured to find the ONU on a path of a plurality of paths.

The ranging module is configured to select one path from the plurality of paths and perform a ranging on the ONU on the selected path.

Figure 4:
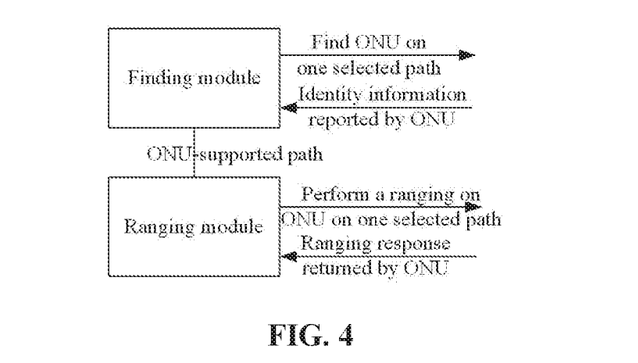
FIG. 4 is a structure diagram of an apparatus for activating an ONU in a multi-path PON according to an embodiment of the present disclosure.

FIG. 4 is a structure diagram of an apparatus for activating an ONU in a multi-path PON according to an embodiment of the present disclosure. As shown in FIG. 4, the apparatus includes at least a finding module and a ranging module.

The finding module is configured to open a quiet window on one or more paths of the plurality of paths and find one or more ONUs on the one or more paths on which the quiet window has been opened; and receive identity information reported by the ONU.

The ranging module is configured to select one path from the plurality of paths and perform, on the selected path, a ranging on one or more ONUs that have been found; and receive a ranging response returned by each of the one or more ONUs.

The finding module is further configured to open the quiet window on all paths and receive information each of the one or more ONUs about a path supported by the each of the one or more ONUs.

The ranging module is configured to select the one path from the plurality of paths according to obtained ONU identity information, information about the plurality of paths and local information and perform a ranging on the one or more ONUs on the selected one path from the plurality of paths, and select the one path on which the quiet window has been opened from the plurality of paths and send a ranging request to the each of the one or more ONUs on the one path; and configured to receive the ranging response returned by the ONU, and calculate a ranging result on the one path and calculate ranging results on other paths according to wavelength values, or calculate ranging results on the one path and on other one or more paths on which the ranging response has been received, or calculate ranging results on the one path and on other one or more paths on which the ranging response has been received, and calculate ranging results on other wavelength pairs in a same optical fiber according to wavelength values and the ranging results on the path and on the other one or more paths on which the ranging response has been receive.

The apparatus shown in FIG. 4 may be an independent entity or may be arranged in the OLT.

It is to be noted that if the apparatus shown in FIG. 4 includes only a finding module, the apparatus constitutes an apparatus for finding an ONU according to embodiments of the present disclosure, where the apparatus may be an independent entity or may be arranged in the OLT; and if the apparatus shown in FIG. 4 includes only a ranging module, the apparatus constitutes an apparatus for performing a ranging on an ONU according to embodiments of the present disclosure, where the apparatus may be an independent entity or may be arranged in the OLT.

Embodiments of the present disclosure further provide another apparatus for activating an ONU corresponding to the method provided by foregoing embodiments of the present disclosure. The apparatus includes at least a finding processing module and/or a ranging processing module.

The finding processing module is configured to return its own identity information on a path of a plurality of paths.

The ranging processing module is configured to select one or more paths from the plurality of paths and return a ranging response on the selected one or more paths.

Figure 5:
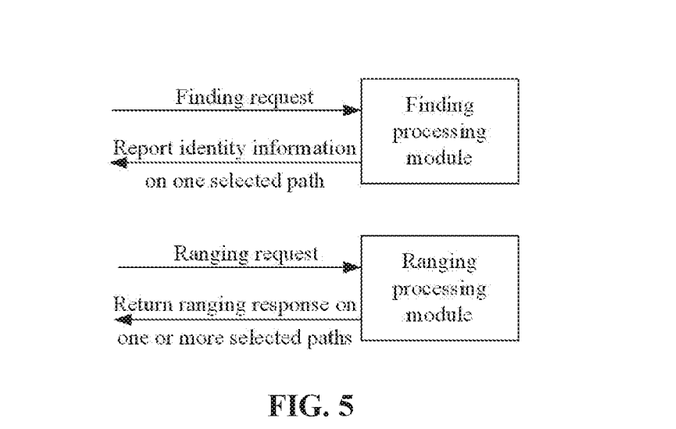
FIG. 5 is a structure diagram of another apparatus for activating an ONU in a multi-path PON according to an embodiment of the present disclosure.

FIG. 5 is a structure diagram of another apparatus for activating an ONU in a multi-path PON according to an embodiment of the present disclosure. As shown in FIG. 5, the apparatus includes at least a finding processing module and a ranging processing module.

The finding processing module is configured to receive a finding request from an Optical Line Terminal (OLT), and select one path from a plurality of paths and return its own identity information to the OLT on the selected one path.

The ranging processing module is configured to receive a ranging request from an Optical Line Terminal (OLT), and select one or more paths from the plurality of paths and return the ranging response to the OLT on the one or more of the plurality of paths.

The ranging processing module is configured to: in a case that the plurality of paths are a plurality of wavelength pairs in one optical fiber, return the ranging response to the OLT on a path on which the ranging request has been received; or in a case that the plurality of paths are a plurality of optical fibers or a plurality of wavelength pairs in a plurality of optical fibers, simultaneously return the ranging response to the OLT on the path on which the ranging request has been received and on other one or more paths.

The apparatus shown in FIG. 5 may be an independent entity or may be arranged in the ONU.

It is to be noted that if the apparatus shown in FIG. 5 includes only a finding processing module, the apparatus constitutes another apparatus for finding an ONU according to embodiments of the present disclosure, where the apparatus may be an independent entity or may be arranged in the ONU; and if the apparatus shown in FIG. 5 includes only a ranging processing module, the apparatus constitutes another apparatus for measuring range to an ONU according to embodiments of the present disclosure, where the apparatus may be an independent entity or may be arranged in the ONU.

The solution provided by embodiments of the present disclosure will be detailed below in conjunction with application scenarios. The solution provided by embodiments of the present disclosure will be described in conjunction with structures of the multi-path PON shown in FIGS. 2a and 2b.

Embodiment 1:

Assume that an OLT is not sure of the number of paths supported by an ONU and multiple paths are multiple wavelength pairs in one optical fiber. In this case, a method for activating an ONU according to the embodiment of the present disclosure includes the steps described below.

First, the OLT opens a quiet window on all paths and requests identity information of the ONU. Each ONU (that is, ONU1, ONU2 . . . ONUn) selects one path from the multiple paths according to the multiple paths and local information, reports its own OUN identity information on the selected path, and reports its own supported paths and related information such as power consumption.

The OLT can open the quiet window as follows: in the case of light traffic, the OLT can open the quiet window on all paths; and in the case of heavy traffic on some paths and light traffic on other paths, the OLT can open the quiet window on multiple paths with light traffic.

Optionally, to avoid the impact on services caused by opening the quiet window, the OLT may open the quiet window periodically on multiple paths. The multiple paths selected each time may be different as long as all paths are covered.

Then, after obtaining the identity information of each ONU, the OLT selects one path from the multiple paths according to the multiple paths and local information and performs a ranging on each ONU on the selected path; and each ONU returns a ranging response to the OLT on the selected path.

Finally, the OLT calculates a ranging result on the selected path, and calculates ranging results on other paths according to wavelength values. Then, the OLT can apply the ranging results on these paths locally or send the ranging results to each ONU.

It is to be noted that when light is transmitted in an optical fiber, the length of the optical fiber is constant, but the light is refracted/reflected, not transmitted along a straight line. Light with different wavelengths has different refractivities and reflectivities, and is transmitted for different time in optical fibers with the same length, but as long as the transmission time of light with one wavelength in the optical fiber is known, the transmission time of light with another wavelength can be calculated according to the refractivities/reflectivities of the light with the two wavelengths. In the embodiment of the present disclosure, the implementation mode of calculating the ranging results on other paths according to the wavelength values is neither limited nor intended to limit the scope of the present application, and will not be described herein.

Embodiment 2:

Assume that an OLT is not sure of the number of paths supported by an ONU and multiple paths are multiple optical fibers (different optical fibers with the same wavelength). In this case, a method for activating an ONU according to the embodiment of the present disclosure includes the steps described below.

First, the OLT opens a quiet window on all paths and requests identity information of the ONU. Each ONU (that is, ONU1, ONU2 . . . ONUn) selects one path from the multiple paths according to the multiple paths and local information, reports its own identity information on the selected path, and reports its own supported paths and related information.

Then, after obtaining the identity information of each ONU, the OLT selects one path from the multiple paths according to the multiple paths and local information and performs a ranging on each ONU on the selected path; and each ONU simultaneously sends a ranging response to the OLT on the selected path and returns the ranging response to all other paths.

Finally, the OLT calculates a ranging result on the selected path, and calculates ranging results on other paths on which the ranging response has been received. Then, the OLT can apply these ranging results locally or send these ranging results to the ONU.

Embodiment 3:

Assume that an OLT is sure of the number of paths supported by an ONU and multiple paths are multiple wavelength pairs in one optical fiber. In this case, a method for activating an ONU according to the embodiment of the present disclosure includes the steps described below.

First, the OLT opens a quiet window on multiple paths and requests identity information of the ONU. Each ONU (that is, ONU1, ONU2 . . . ONUn) selects one path from the multiple paths according to the multiple paths and local information and reports its own identity information on the selected path.

Then, after obtaining the identity information of each ONU, the OLT selects one path from the multiple paths according to the multiple paths and local information and performs a ranging on each ONU on the selected path; and each ONU returns a ranging response to the OLT on the selected path.

Finally, the OLT calculates a ranging result on the selected path, and calculates ranging results on other paths according to wavelength values. Then, the OLT can apply these ranging results locally or send these ranging results to each ONU.

Embodiment 4:

Assume that an OLT is sure of the number of paths supported by an ONU and multiple paths are multiple optical fibers (different optical fibers with the same wavelength). In this case, a method for activating an ONU according to the embodiment of the present disclosure includes the steps described below.

First, the OLT opens a quiet window on multiple paths and requests identity information of the ONU. Each ONU (that is, ONU1, ONU2 . . . ONUn) selects one path from the multiple paths according to the multiple paths and local information and reports its own identity information on the selected path.

Then, after obtaining the identity information of each ONU, the OLT selects one path from the multiple paths according to the multiple paths and local information and performs a ranging on each ONU on the path; and each ONU simultaneously returns a ranging response to the OLT on the path and sends the ranging response to other one or more paths.

Finally, the OLT calculates a ranging result on the path, and calculates ranging results on other paths on which the ranging response has been received. Then, the OLT can apply these ranging results locally or send these ranging results to each ONU.

Embodiment 5:

Assume that an OLT is not sure of the number of paths supported by an ONU and multiple paths are multiple wavelength pairs in multiple optical fibers. In this case, a method for activating an ONU according to the embodiment of the present disclosure includes the steps described below.

First, the OLT opens a quiet window on multiple paths and requests identity information of the ONU. Each ONU (that is, ONU1, ONU2 . . . ONUn) selects one path from the multiple paths according to the multiple paths and local information, reports its own identity information on the selected path, and reports its own supported paths and related information.

Then, after obtaining the identity information of each ONU, the OLT selects one path from the multiple paths according to the multiple paths and local information and performs a ranging on each ONU on the selected path; and each ONU simultaneously returns a ranging response to the OLT on the selected path and sends the ranging response to other one or more paths.

Finally, the OLT calculates ranging results on the selected path and on the other one or more paths on which the ranging response has been received, and calculates ranging results on other wavelength pairs in a same optical fiber according to the wavelength values and the ranging results on the selected path and on the other one or more paths on which the ranging response has been received. Then, the OLT can apply these ranging results locally or send these ranging results to each ONU.

Embodiment 6:

Assume that an OLT is sure of the number of paths supported by an ONU and multiple paths are multiple wavelength pairs in multiple optical fibers. In this case, a method for activating an ONU according to the embodiment of the present disclosure includes the steps described below.

First, the OLT opens a quiet window on multiple paths and requests identity information of the ONU. Each ONU (that is, ONU1, ONU2 . . . ONUn) selects one path from the multiple paths according to the multiple paths and local information and reports its own identity information on the selected path.

Then, after obtaining the identity information of each ONU, the OLT selects one path from the multiple paths according to the multiple paths and local information and performs a ranging on each ONU on the selected path; and each ONU simultaneously returns a ranging response to the OLT on the selected path and sends the ranging response to other one or more paths.

Finally, the OLT calculates ranging results on the selected path and on the other one or more paths on which the ranging response has been received, and calculates ranging results on other wavelength pairs in a same optical fiber according to the wavelength values and the ranging results on the selected path and on the other one or more paths on which the ranging response has been received. Then, the OLT can apply these ranging results locally or send these ranging results to each ONU.

It is to be noted that the above embodiments all use examples in which both the finding process and the ranging process use the solution provided by embodiments of the present disclosure. However, it is to be noted again that it is feasible that, in a complete ONU activation process, the finding process uses the solution provided by embodiments of the present disclosure while the ranging process is implemented using other modes, that is, it is feasible for the OLT not to select one path from the multiple paths and perform ranging on each ONU on the selected path; or the finding process is implemented using other modes while the ranging process uses the solution provided by embodiments of the present disclosure, that is, it is feasible for the OLT not to find ONU(s) on a path of the multiple paths.

Embodiments of the present disclosure further provide a computer-readable storage medium configured to store computer-executable instructions for implementing the above-mentioned method for activating an ONU when the computer-executable instructions are executed.

It will be understood by those of ordinary skill in the art that all or part of the steps in the methods described above may be implemented by related hardware (e.g., a processor) instructed by one or more programs, and these programs may be stored in a computer-readable storage medium such as a ROM, a magnetic disk, an optical disk or the like. Optionally, all or part of the steps in the embodiments described above may also be implemented using one or more integrated circuits. Accordingly, the modules/units in the embodiments described above may be implemented by hardware. For example, the functions of these modules/units may be implemented by one or more integrated circuits. Alternatively, these modules/units may be implemented by software function modules. For example, the functions of these modules/units may be implemented by using a processor to execute program instructions stored in a storage medium. Embodiments of the present disclosure are not limited to any specific combination of hardware and software.

The above are only preferred embodiments of the present disclosure and are not intended to limit the scope of the present application. Any modifications, equivalent substitutions, improvements and the like made within the spirit and principle of the present application are within the scope of the present application.

INDUSTRIAL APPLICABILITY

Through a method and apparatus for activating an ONU provided by embodiments of the present application, an activation process does not need to be performed on all paths, thereby quickly completing an activation process of a multi-path PON in a multi-path PON structure and improving work efficiency.

What is claimed is:

1. A method for activating an Optical Network Unit (ONU), wherein the ONU communicates with an Optical Line Terminal (OLT) through a plurality of paths, comprising:
   finding the ONU by the OLT on a path of the plurality of paths; and
   selecting one path from the plurality of paths and performing a ranging on the ONU on the selected path, by the OLT,
   wherein each ONU on the plurality of paths is provided with one and only one identifier, and each of the plurality of paths is provided with a path identifier corresponding to one channel;
   wherein the method is performed by at least one processor.

2. The method of claim 1, wherein the finding the ONU by the OLT on the path of the plurality of paths comprises:
   opening a quiet window by the OLT on one or more paths of the plurality of paths and finding one or more ONUs by the OLT on the one or more paths on which the quiet window has been opened, and receiving, by the OLT, ONU identity information returned by each of the one or more ONUs on one path determined from the one or more paths on which the quiet window has been opened.

3. The method of claim 2, wherein the each of the one or more ONUs selects one path from the one or more paths on which the quiet window has been opened according to information about the one or more paths on which the quiet window has been opened and local information, and reports the identity information of the each ONU on the selected one path.

4. The method of claim 3, wherein the local information of the each of the one or more ONUs comprises at least one of the following information: whether the ONU was activated on one path of the one or more paths on which the quiet window has been opened last time or before, determining by the ONU whether a collision is relatively small when the ONU returns the identity information on the path, or whether working power consumption of the ONU is relatively low on the path.

5. The method of claim 2, wherein the one or more paths on which the OLT has opened the quiet window are ONU-supported paths.

6. The method of claim 5, wherein if the OLT is not sure of the ONU-supported paths, the OLT opens the quiet window on all paths; and
   the method further comprises: receiving, by the OLT, information reported by the each of the one or more ONUs about a path supported by the each of the one or more ONUs.

7. The method of claim 1, wherein the selecting the one path from the plurality of paths and performing the ranging on the ONU on the selected path, by the OLT comprises:
   selecting the one path from the plurality of paths and performing, on the selected path, the ranging on one or more ONUs that have been found, and receiving, by the OLT, a ranging response returned by each of the one or more ONUs on one or more paths selected from the plurality of paths to make the OLT obtain a ranging result.

8. The method of claim 7, wherein the selecting the one path from the plurality of paths by the OLT comprises:
   selecting the one path from the plurality of paths according to obtained ONU identity information, information about the plurality of paths and local information, and performing a ranging on the one or more ONUs on the selected one path from the plurality of paths.

9. The method of claim 8, wherein the local information of the OLT comprises at least one of the following information:
   whether or not a path from the plurality of paths is a path that underwent ranging when the one or more ONUs were activated last time or before; whether or not the path from the plurality of paths is a path on which the OLT estimates that a return time is relatively short; whether or not the path from the plurality of paths is a path on which traffic is relatively light; or whether or not the path from the plurality of paths is a path on which local working power consumption of the OLT is relatively small.

10. The method of claim 7, wherein the each of the one or more ONUs selects the one or more paths from the plurality of paths and returns the ranging response on the selected one or more paths to make the OLT obtain the ranging result as follows:
   in a case that the plurality of paths are a plurality of wavelength pairs in one optical fiber, the each of the one or more ONUs returns, to the OLT, the ranging response on a path on which a ranging request has been sent; and the OLT calculates a ranging result on the path and calculates ranging results on other paths according to wavelength values; or
   in a case that the plurality of paths are a plurality of optical fibers, the each of the one or more ONUs simultaneously returns, to the OLT, the ranging response on the path on which the ranging request has been sent and returns, to the OLT, the ranging response on other one or more paths; and the OLT calculates ranging results on the path and on the other one or more paths on which the OLT receives the ranging response; or
   in a case that the plurality of paths are a plurality of wavelength pairs in a plurality of optical fibers, the each of the one or more ONUs simultaneously returns, to the OLT, the ranging response on the path on which the ranging request has been sent and returns, to the OLT, the ranging response on other one or more paths; and the OLT calculates ranging results on the path and on the other one or more paths on which the OLT receives the ranging response, and calculates ranging results on other wavelength pairs in a same optical fiber according to wavelength values and the ranging results on the path and on the other one or more paths on which the OLT receives the ranging response.

11. An apparatus for activating an Optical Network Unit (ONU), comprising a finding module and a ranging module, wherein
the finding module is configured to find the ONU on a path of a plurality of paths; and
the ranging module is configured to select one path from the plurality of paths and perform a ranging on the ONU on the selected path;
wherein each ONU on the plurality of paths is provided with one and only one identifier, and each of the plurality of paths is provided with a path identifier corresponding to one channel.

12. The apparatus of claim 11, wherein the finding module is configured to open a quiet window on one or more paths of the plurality of paths and find one or more ONUs on the one or more paths on which the quiet window has been opened; and receive identity information reported by the ONU.

13. The apparatus of claim 12, wherein the finding module is further configured to open the quiet window on all paths and receive information reported by the each of the one or more ONUs about a path supported by the each of the one or more ONUs.

14. The apparatus of claim 11, wherein the ranging module is configured to determine one path from the one or more paths on which the quiet window has been opened and perform, on the determined path, the ranging on one or more ONUs that have been found; and receive a ranging response returned by each of the one or more ONUs.

15. The apparatus of claim 14, wherein the ranging module is configured to select the one path from the plurality of paths according to obtained ONU identity information, information about the plurality of paths and local information and perform a ranging on the one or more ONUs on the selected one path from the plurality of paths, and select the one path on which the quiet window has been opened from the plurality of paths and send a ranging request to the each of the one or more ONUs on the one path; and
receive the ranging response returned by the ONU, and calculate a ranging result on the one path and calculate ranging results on other paths according to wavelength values; or calculate ranging results on the one path and on other one or more paths on which the ranging response has been received; or calculate ranging results on the one path and on other one or more paths on which the ranging response has been received, and calculate ranging results on other wavelength pairs in a same optical fiber according to wavelength values and the ranging results on the path and on the other one or more paths on which the ranging response has been receive.

16. An apparatus for activating an Optical Network Unit (ONU), comprising a finding processing module and a ranging processing module, wherein
the finding processing module is configured to return identity information of an ONU on one path of a plurality of paths; and
the ranging processing module is configured to select one or more paths from the plurality of paths and return a ranging response on the selected one or more paths;
wherein each ONU on the plurality of paths is provided with one and only one identifier, and each of the plurality of paths is provided with a path identifier corresponding to one channel.

17. The apparatus of claim 16, wherein the finding processing module is configured to receive a finding request from an Optical Line Terminal (OLT), and select the one path from the plurality of paths and return the identity information of an ONU to the OLT on the selected one path.

18. The apparatus of claim 16, wherein the ranging processing module is configured to receive a ranging request from an Optical Line Terminal (OLT), and select the one or more paths from the plurality of paths and return the ranging response to the OLT on the selected one or more paths.

19. The apparatus of claim 18, wherein the ranging processing module is configured to:
in a case that the plurality of paths are a plurality of wavelength pairs in one optical fiber, return the ranging response to the OLT on a path on which the ranging request has been received; or
in a case that the plurality of paths are a plurality of optical fibers or a plurality of wavelength pairs in a plurality of optical fibers, simultaneously return the ranging response to the OLT on the path on which the ranging request has been received and on other one or more paths.

* * * * *